/ Patented Aug. 6, 1940

2,210,364

UNITED STATES PATENT OFFICE 2,210,364

PROCESS FOR THE MANUFACTURE OF AZO DYESTUFFS

Friedrich Felix and Werner Zuercher, Basel, Switzerland, assignor to Society of Chemical Industry in Basle, Basel, Switzerland No Drawing. Application March 6, 1939, Serial No. 260,225. In Switzerland March 5, 1938

4 Claims. (Cl. 260—205)

(Granted under the provisions of sec. 14, act of March 2, 1927; 357 O. G. 5)

It is known that violet and blue aminoazo dyestuffs may be produced by coupling a diazo-compound produced by diazotizing an aromatic base carrying several negative substituents with an amine capable of being coupled. The manufacture of such dyestuffs, however, frequently presents remarkable difficulties, since the diazo-compounds of the amines of the kind in question are very unstable to water and other solvents, for instance ethyl alcohol.

The present invention relates to the manufacture of azo dyestuffs of high degree of purity and in good yield by coupling a diazo-compound produced from an aromatic amine carrying several negative substituents with a coupling component in presence of methyl alcohol. The process is particularly suitable for the manufacture of such azo dyestuffs which are formed by coupling a diazo-compound of such an aromatic amine which carries a great number of negative substituents with such an aromatic amine which in consequence of the presence of an unsubstituted or substituted amino-group is capable of coupling. Such an amino-group corresponds thus to the general formula

$R_1$ standing for H, alkyl (this term meaning also a substituted alkyl group, above all a hydroxylated or a chlorinated alkyl-group), an aralkyl group or an aryl group, $R_2$ standing for H, alkyl (this term meaning also a substituted alkyl group, for example a hydroxylated or a chlorinated alkyl group) or an aralkyl group.

Among the dyestuffs obtained as above described special mention is made of such dyestuffs, the diazo-compounds of which contain two nitro-groups in addition to any other negative substituents.

The preferable procedure is to dissolve the coupling component in methyl alcohol and to add the diazo-compound, generally in dissolved form, for example in concentrated sulfuric acid, to the strongly cooled solution of the coupling component. There may be added to the methyl alcoholic solution an agent which binds acid, for instance sodium acetate, sodium carbonate, ammonia in liquid or gaseous form, a salt of ammonium, magnesium or calcium, further also an organic base such as pyridine. When the sensitivity of the diazo-compound towards water is unusually great it may be of advantage to add sodium methylate to the solution before or during the coupling of the diazo-compound.

Among aromatic amines which carry several negative substituents and are suitable for making dyestuffs by the process of the invention there may be named dinitroaminobenzenes, for example 2:4-dinitroaminobenzene, 2:4-dinitro-6-halogenaminobenzenes, for instance 2:4-dinitro-6-chloraminobenzene, 2:4-dinitro-6-cyanoaminobenzene, 2:4-dinitro-6-methoxyaminobenzene; also compounds which contain sulfone groups or sulfamido groups as substituents, for instance 2:4-dinitroaminobenzene-6-methylsulfone, 2:4-dinitroaminobenzene-6-ethylsulfone, 2:4-dinitroaminobenzene-6-benzylsulfone, 2:4-dinitroaminobenzene-6-phenylsulfone, 2:4-dinitroaminobenzene-6-sulfamide or a 2:4-dinitroaminobenzene-6-dialkylsulfamide, further also a 2:5-dinitroaminobenzene and substitution products thereof. Moreover it is also possible to use in this manner 2:4:6-trinitroaminobenzene in the form of its diazo-compound for the manufacture of dyestuffs.

As coupling components for use in the process all compounds are applicable which enter into reaction with diazo-compounds.

Of particular interest, however, are those components which, owing to the presence of a substituted or non-substituted amino-group lend themselves to the production of aminoazo dyestuffs. Therefore, there may be used aniline, ortho- or meta-toluidine, para-xylidine, para-cresidine, 2:5-dioxyalkylaminobenzenes, naphthylamines and the amines alkylated and/or oxy-alkylated in the amino-group, further also such oxyalkylated amines, the hydroxyl-groups of which may be etherified or esterified. It is preferably question of N-ethyloxyethylaminobenzene, N-ethyloxyethyl-3-methylaminobenzene, N-dioxyethyl-3-methylaminobenzene, N-oxyethyl-3-methyl-6-methoxyaminobenzene, N-dioxyethyl-3-methyl-6-methoxyaminobenzene, N-ethyl-oxyethyl-3-methyl-6-methoxyaminobenzene, N-butyloxyethyl-3-methyl-6-methoxyaminobenzene, N-dioxyethyl-3-acetylamino-6-methoxyamino-benzene, N-oxyethyl-3-acetylamino-6-methoxyaminobenzene and the like, further of naphthylamines, such as 2-ethylnaphthylamine or 1-amino-5-oxynaphthalene and alkylation products thereof which may be obtained for example by treating 1-amino-5-oxynaphthalene with epichlorohydrine at high temperatures.

The following example illustrates the invention:

7:2 parts by weight of sodium nitrite are dissolved in 108 parts of concentrated sulfuric acid. The solution is warmed for a short time at 60° C., and then cooled to 0-5° C., and there are added gradually 26.1 parts 2:4-dinitraminobenzene-6-methylsulfone. The whole is stirred at 30-40° C. until a clear solution is produced. The latter is now gradually introduced while stirring and cooling into a solution made from 22.5 parts of N-dioxyethyl-3-methyl-6-methoxyaminobenzene and 200-300 parts of methyl alcohol. The methyl alcohol solution may contain with advantage an acid binding agent, for instance magnesium oxide or magnesium carbonate or ammonium salt or also ammonia. Thus, by adding 21.6 parts of magnesium oxide advantageous results may be obtained. After addition of water and filtering, the dyestuff is isolated. The methyl alcohol may be recovered without difficulty. The dyestuff dyes acetate artificial silk fast blue tints capable of white discharge. The process is similar with any other of the named diazo-compounds used or compounds similar thereto. In certain cases even better results are obtained if the quantity of the methyl alcohol used in increased, for example to about 500 parts.

Other azo dyestuffs which also dye blue or violet tints may be produced from the same diazo-compound and according to the same process when using for example N-oxyethyl-3-methyl-6-methoxyaminobenzene instead of N-dioxyethyl-3-methyl-6-methoxyaminobenzene or also products which contain an unsubstituted alkyl radical, for example N-ethyloxyethyl-3-methyl-6-methoxyaminobenzene or N-butyl-oxyethyl-3-methyl-6-methoxyaminobenzene. A dyestuff of very great tinctorial strength is obtained when using N-dioxyethyl-3-methylaminobenzene as coupling component. When treating 2:4-dinitro-6-cyanoaminobenzene in sulfuric acid with sodium nitrite there is obtained its diazo-compound which may also be used for the manufacture of dyestuffs by coupling it with an amine dissolved in methyl alcohol, for example with N-dioxyethyl-3-methylaminobenzene or N-ethyloxyethyl-3-methylaminobenzene or N-butyloxyethyl-3-methylaminobenzene, acid binding agents may also be used for partly removing the sulfuric acid. The procedure is similar when using the diazo-compound of the 2:4-dinitro-6-halogenbenzenes, dyestuffs dyeing violet and blue tints being obtained when using the above named coupling component. Coupling components such as for example N-dioxyethyl-3-acetylamino-6-methoxyaminobenzene may also be used, further N-oxyethyl-3-acetylamino-6-methoxyaminobenzene and N-ethyloxyethyl-3-acetylamino-6-methoxyaminobenzene.

The operation is similar when using diazo-compounds of the 2:5-dinitroaminobenzene, products dyeing somewhat redder tints being obtained. The method of working is in all cases similar with that indicated in the foregoing example. Dyestuffs dyeing blue tints of great strength are also obtained when using 4-nitro-2-chloro-6-cyanoaminobenzene which when coupled with a methyl alcohol solution of N-dioxyethyl - 3 - acetylamino - 6-methoxyaminobenzene yields a particularly pure dyestuff.

What we claim is:

1. Process for the manufacture of azo dyestuffs from the diazo-compounds of such aromatic mononuclear amines which carry several negative substituents and such aromatic amines of the benzene and naphthalene series which in consequence of the presence of an unsubstituted or substituted amino-group are capable of coupling, comprising coupling in the presence of methyl alcohol and in the absence of water.

2. Process for the manufacture of azo dyestuffs from the diazo-compounds of such aromatic mononuclear amines which contain at least two nitro-groups in the molecule and such aromatic amines of the benzene and naphthalene series which in consequence of the presence of an unsubstituted or substituted amino-group are capable of coupling, comprising coupling in the presence of methyl alcohol and in the absence of water.

3. Process for the manufacture of azo dyestuffs from such diazo-compounds which are derived from 2:4-dinitro-aminobenzenes and such aromatic amines of the benzene series which in consequence of the presence of an unsubstituted or substituted amino-group are capable of coupling, comprising coupling in the presence of methyl alcohol and in the absence of water.

4. Process for the manufacture of azo dyestuffs from the diazo-compound of the 2:4-dinitro-aminobenzene-6-methylsulfone and such aromatic mononuclear amines of the benzene series which in consequence of the presence of an alkylated amino-group whose alkyl radicals carry hydroxyl groups are capable of coupling, comprising coupling in the presence of methyl alcohol and in the absence of water.

FRIEDRICH FELIX.
WERNER ZUERCHER.